United States Patent
McGlew et al.

(10) Patent No.: US 8,250,309 B2
(45) Date of Patent: Aug. 21, 2012

(54) CONTROL OF DATA ACCESSES TO A CACHE IN DATA PROCESSING

(75) Inventors: Patrick Gerard McGlew, Cambridge (GB); Andrew Burdass, Cambridgeshire (GB)

(73) Assignee: ARM Limited, Cambridge (GB)

( * ) Notice: Subject to any disclaimer, the term of this patent is extended or adjusted under 35 U.S.C. 154(b) by 1167 days.

(21) Appl. No.: 11/044,260

(22) Filed: Jan. 28, 2005

(65) Prior Publication Data

US 2005/0182905 A1 Aug. 18, 2005

(30) Foreign Application Priority Data

Feb. 16, 2004 (GB) .................................. 0403371.8

(51) Int. Cl.
*G06F 12/00* (2006.01)
(52) U.S. Cl. .......................... 711/145; 711/144; 711/138
(58) Field of Classification Search .................. 711/118, 711/144, 119, 145, 138
See application file for complete search history.

(56) References Cited

U.S. PATENT DOCUMENTS

| | | | | |
|---|---|---|---|---|
| 4,939,641 A | * | 7/1990 | Schwartz et al. | 711/146 |
| 5,493,664 A | * | 2/1996 | Doi | 711/100 |
| 5,579,512 A | * | 11/1996 | Goodrum et al. | 703/23 |
| 5,835,963 A | * | 11/1998 | Yoshioka et al. | 711/207 |
| 6,073,129 A | * | 6/2000 | Levine et al. | 707/4 |
| 6,138,177 A | * | 10/2000 | Williams et al. | 710/8 |
| 6,237,066 B1 | * | 5/2001 | Pan et al. | 711/149 |
| 6,247,144 B1 | * | 6/2001 | Macias-Garza et al. | 714/25 |
| 6,256,708 B1 | * | 7/2001 | Watanabe | 711/122 |
| 6,557,080 B1 | * | 4/2003 | Burger et al. | 711/137 |
| 2003/0028728 A1 | | 2/2003 | Ito | |
| 2003/0167378 A1 | * | 9/2003 | Suetake | 711/118 |

FOREIGN PATENT DOCUMENTS

| | | |
|---|---|---|
| JP | 4-501027 | 2/1992 |
| JP | 5-204709 | 8/1993 |
| JP | 08-320829 | 12/1996 |
| JP | 2002-163148 | 6/2002 |
| JP | 2003-044358 | 2/2003 |
| JP | 2003-256277 | 9/2003 |

OTHER PUBLICATIONS

List of cited references, Japanese Office Action dated Jun. 2, 2010 and English translation thereof.
Japanese List of Cited References mailed Jun. 14, 2011 in counterpart JP application.

* cited by examiner

*Primary Examiner* — Hong Kim
(74) *Attorney, Agent, or Firm* — Nixon & Vanderhye P.C.

(57) ABSTRACT

A data processor comprising: a control register operable to store a cache control value; and data accessing logic responsive to a data access instruction and to said cache control value to look for data to be accessed in a cache if said cache control value has a predetermined value and not to look for said data to be accessed in said cache if said cache control value does not have said predetermined value.

8 Claims, 6 Drawing Sheets

Standard mechanism for requesting external memory

Scheme for avoiding cache lookup penalty when cache disabled or not present

CONTROL OF DATA ACCESSES TO A CACHE IN DATA PROCESSING

BACKGROUND OF THE INVENTION

1. Field of the Invention

The present invention relates to the field of accessing data during data processing.

2. Description of the Prior Art

Data processors typically store data in a number of different places, which generally include memory regions and at least one cache. The memory regions can be formed of different types of memory, but in general they are relatively cheap and therefore can be large but they are not quick to access. Caches on the other hand generally comprise faster data storage and are therefore more expensive but are quicker to access. Thus, in order to improve the performance of a data processor, and in particular data accesses within the processor, data that is to be accessed a number of times may be copied from memory to a cache. Then in response to a data access request the processor will generally look to see if the data is in the cache first, and only if it is not there and a cache miss occurs, will it look further at other memory.

FIG. 1 shows a flow diagram showing a standard mechanism for requesting external memory according to the prior art. A memory request is delivered from the instruction pipeline of the processor and in response to this, the processor looks in the cache for the piece of data requested (read cache memory). If there is a cache hit detection, then the data is returned to the pipeline, i.e. the "yes" line is followed. If there is no cache hit detection, then the processor follows the "no" line and proceeds to request an external memory access and perform this external memory access to retrieve the data.

As access to memory is much more time consuming than access to a cache is, improvements to the performance of data processors, with regard to data access, are generally concerned with providing more cache and improving cache access.

SUMMARY OF THE INVENTION

A first aspect of the present invention provides, a data processor comprising: a control register operable to store a cache control value; and data accessing logic responsive to a data access instruction and to said cache control value to look for data to be accessed in a cache if said cache control value has a predetermined value and not to look for said data to be accessed in said cache if said cache control value does not have said predetermined value.

The present invention recognises and addresses the problem that in some circumstances, such as situations where predictability is important, it may be inappropriate to use a cache, although the performance of the processor may still be important. It addresses this problem, by improving the speed of memory accesses by providing a control value within a control register, the value of the control value determining if the data accessing logic is to look in a cache or not. Conventionally, when a data access is performed the processor looks for the data in the cache and if it is not there a cache miss occurs, whereupon the processor looks elsewhere, for example, in memory. In the present invention, a control value is used to eliminate the cache look, cache miss step in certain cases where it is known that the data cannot be in the cache. This provides a saving of both execution time and power for each memory data access where it is known in advance that the data cannot be in the cache. The saving of execution time in such a circumstance depends on the implementation but may be two cycles or more per memory data access.

Preferably, said cache control value has said predetermined value to indicate an enabled cache is present within said data processor.

If the data processor does not comprise an enabled cache then clearly it is a waste of time to look within a cache for a piece of data. In such circumstances, setting the control value not to have a predetermined value avoids the processor looking in the cache in response to a data access request and returning a cache miss.

In some embodiments, said data processor does not comprise a cache, and said cache control value is hard wired to not comprise said predetermined value.

If a data processor does not comprise a cache, then the cache control value can be set as a default to a value which is not the predetermined value such that all data accesses will not look in the cache. Clearly, if the data processor does not comprise a cache then there is not a circumstance where a data access would have to look in a cache and as such hard wiring of the control value is a practical solution to ensuring that the cache control value is always set to the correct value.

In preferred embodiments, said data processor comprises a cache and is operable in response to said cache being enabled to set said cache control value to said predetermined value. Preferably, said data processor is also operable in response to said cache being disabled to set said cache control value not to have said predetermined value.

In preferred embodiments, the data processor is able to set the cache control value in response to the cache being disabled or enabled, thus data accesses can be controlled such that the cache is only looked at if it is enabled and in situations where it is disabled the data processor will ignore the cache in response to a data access request and thereby avoid the inevitable cache miss.

In some embodiments, said data processor comprises a plurality of caches and said control register is operable to store at least two cache control values, said at least two cache control values indicating which of said plurality of caches, data to be accessed may be found in; said data accessing logic being responsive to a data access instruction and to said at least two cache control values, to look for said data to be accessed in each of the caches indicated by said at least two cache control values and not to look for said data in caches not indicated by said at least two cache control values.

In the cases of data processors that have more than one cache a plurality of control values can be used to indicate whether to look in any, some, or all of the caches. There can in some embodiments be a control value for each cache, in others the control values can be set to certain values to indicate which of the caches. are to be looked at.

In some embodiments, said data processor comprises a further cache control value, said data accessing logic being responsive to the data access instruction and to both said cache control value and said further cache control value to look for data to be accessed in a cache if said cache control value has a predetermined value and said further cache control value does not have a second predetermined value and not to look for said data to be accessed in said cache if either said cache control value does not have said predetermined value or said further cache control value has said second predetermined value.

In some embodiments further control of the data access can be provided by a further control value. This can be set to a second predetermined value to indicate that a condition exists that means a cache should not be looked at. Thus, a cache is only looked at if both control values indicate that this is acceptable. If either control values indicate the cache should not be looked at then it is not read prior to performing a memory access.

In some embodiments this further cache control value is present in the same control register as the cache control value, while in others said data processor comprises a further control register comprising said further cache control value.

In preferred embodiments, said further cache control value has said second predetermined value to indicate said data to be accessed not being in said cache.

The further cache control value can indicate that the data to be accessed is not in the cache and therefore it is not worth looking in the cache. This can be due to a range of reasons.

In some embodiments said data processor is operable to set said further cache control value to have said second predetermined value in response to a detected predetermined state of said data processor and to re-evaluate said further cache control value in response to said data processor detecting said data processor leaving said predetermined state.

Thus, the further control value can indicate a certain state of the processor during which state data is not stored in the cache and as such a cache access during a data access would not produce a cache hit and as such should be avoided. Leaving said predetermined state should trigger re-evaluation and possibly resetting of this control value.

In some embodiments, said control value not having said predetermined value indicates said data processor being in a predetermined state, said data processor being operable to set said cache control value not to have said predetermined value in response to detection of said data processor being in said predetermined state and to re-evaluate said cache control value in response to said data processor detecting said data processor leaving said predetermined state.

Thus, in some embodiments there is only one control value and this can be used to indicate a certain state of the processor during which state data is not stored in the cache rather than the presence of an enabled cache. Entering or leaving this state should trigger re-evaluation and possibly resetting of the control value Preferably, said predetermined state comprises execution of a sequence of data access instructions for accessing a memory region that is not cacheable.

Some memory regions are not cacheable and thus if a sequence of data access instructions are made to this region it makes sense not to look in the cache in response to these data access instructions. This can be achieved by setting a control value during execution of these memory access instructions.

Preferably, said data processor detects said data processor leaving said predetermined state in response to a memory access instruction being an access to a different region of memory.

If the processor is responding to a plurality of data access instructions to a non-cacheable memory region, a change in the memory region indicates that the sequence of data accessing instructions accessing data within this region is over and as such the relevant control value should be re-evaluated.

In some embodiments, said data processor detects said data processor leaving said predetermined state in response to a memory access instruction giving a memory region miss.

A memory region miss may indicate that the sequence of data accessing instructions accessing data within this region is over and as such the relevant control value should be re-evaluated.

Preferably, said data processor is operable to re-issue memory access instructions giving a memory region miss following re-evaluation of said cache control value. This ensures that the memory access finds its data.

According to a second aspect of the present invention there is provided a method of data processing comprising the steps of: storing a cache control value within a control register; and in response to a data access instruction and to said cache control value reading a cache if said cache control value has a predetermined value and not reading said cache if said cache control value does not have said predetermined value.

According to a third aspect of the present invention there is provided a computer program product, which is operable when run on a data processor to control the data processor to perform the steps of the method according to a second aspect of the present invention.

BRIEF DESCRIPTION OF THE DRAWINGS

The present invention will be described further, by way of example only, with reference to preferred embodiments thereof as illustrated in the accompanying drawings, in which.

DESCRIPTION OF THE PREFERRED EMBODIMENTS

Figure 1:
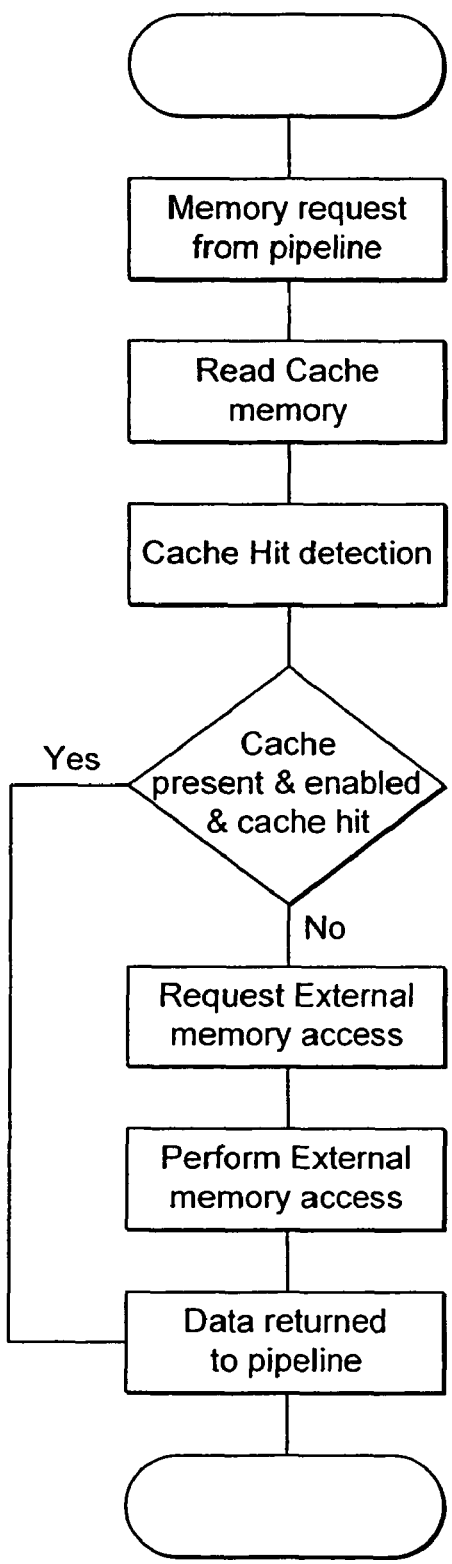
FIG. 1 schematically shows a flow diagram indicating a mechanism for requesting external memory according to the prior art.
Figure 2:
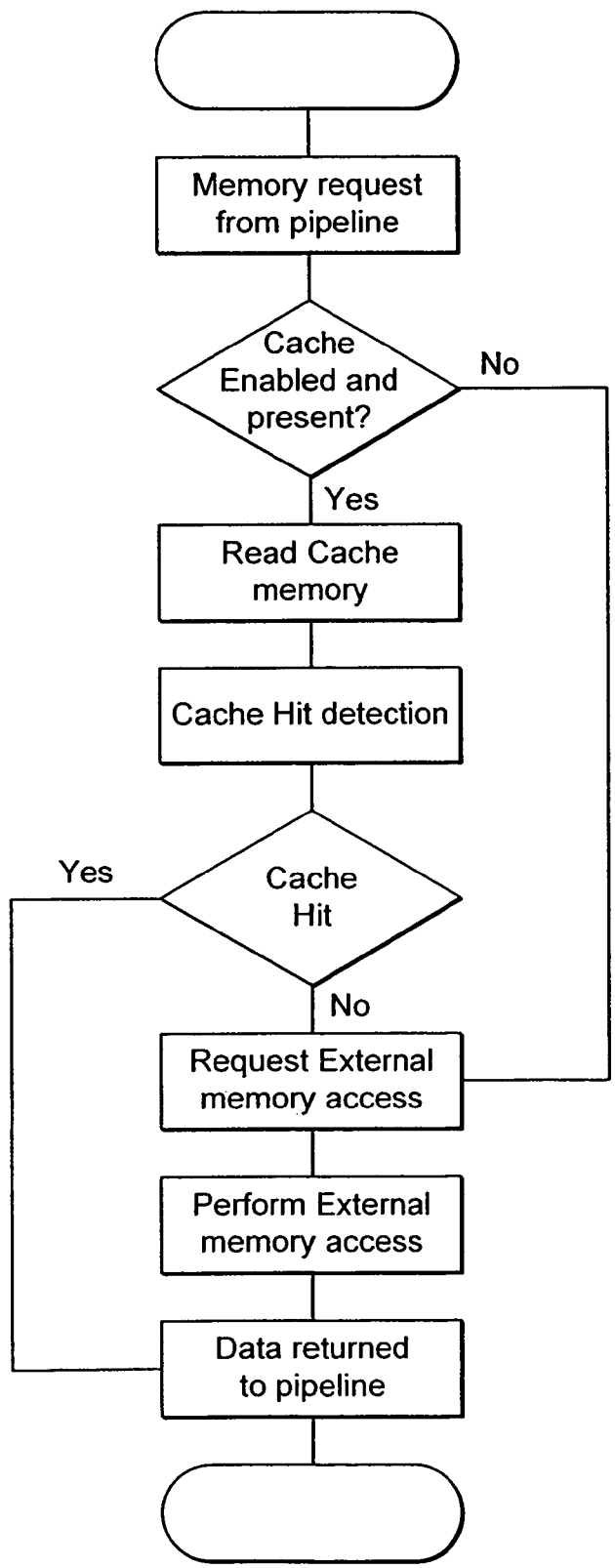
FIG. 2 schematically shows a flow diagram indicating a mechanism for requesting external memory according to an embodiment of the present invention.

FIG. 2 schematically shows a mechanism for accessing external memory according to an embodiment of the present invention. In this case, a memory request is sent from the instruction pipeline and in response to this request the processor acts in one of two ways depending on the value of a control value. The control value is used to indicate the presence of an enabled cache. If the control value indicates the cache to be enabled and present then the processor proceeds in a standard way following the "yes" line to read from the cache memory and if a cache hit is detected to return the data and if not to request and perform an external memory access. If, however, the control value indicates that the cache is either not present or disabled then the processor follows the "no" line and goes straight to requesting and performing an external memory access. As can be seen when comparing this diagram with that of FIG. 1, the provision of this control value saves the processor the steps of read from the cache memory and not detecting a cache hit.

Figure 3:
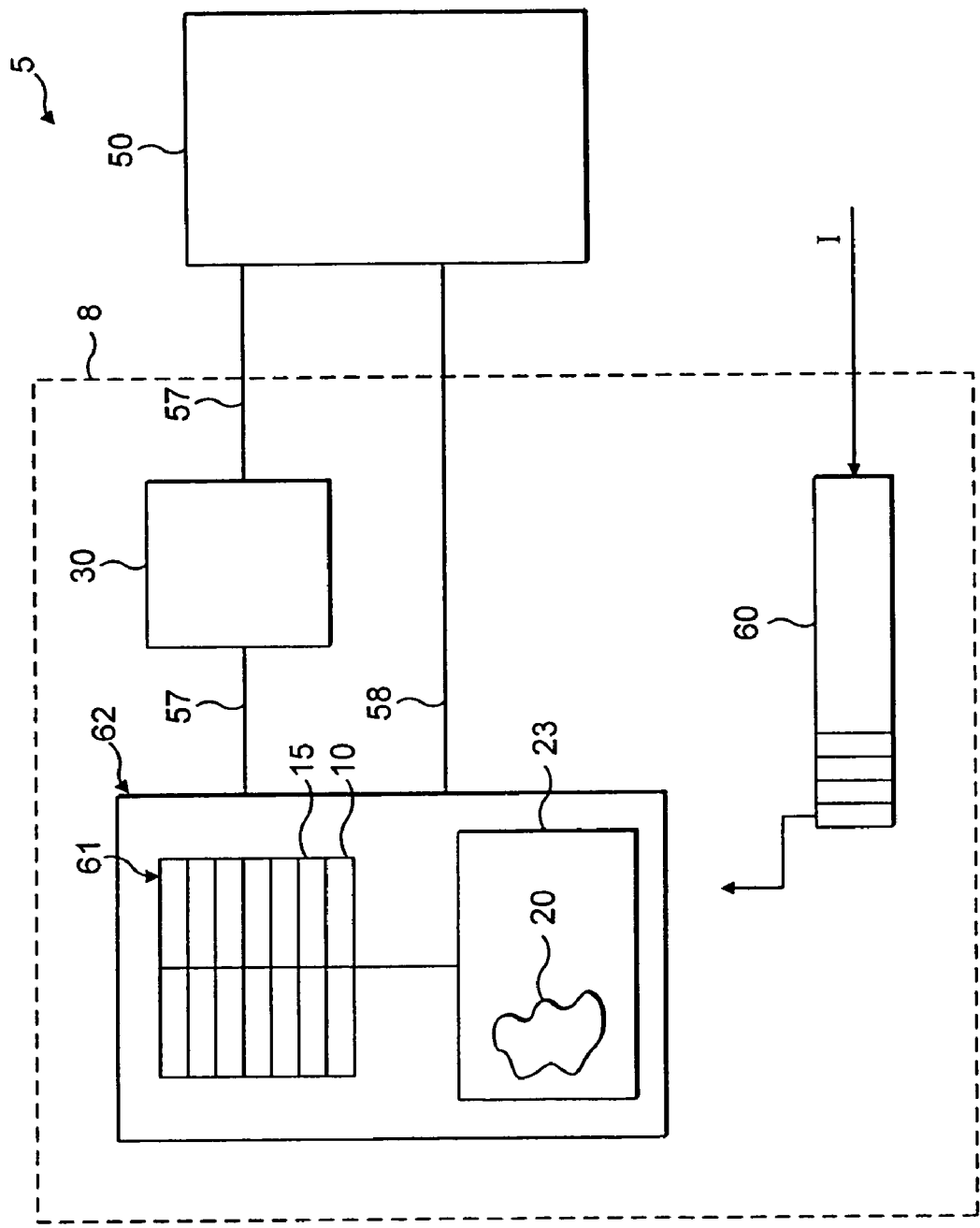
FIG. 3 shows a data processor according to an embodiment of the present invention.

FIG. 3 shows a data processor 5, consisting of an integrated circuit 8 and memory 50. Although the memory is shown as a single block located outside of the integrated circuit, it may in reality comprise several different types of memory, some of which may be located within the integrated circuit 8.

The integrated circuit 8 comprises an instruction pipeline 60, which sends instructions to the core 62. The core 62 comprises block 23 which includes processing logic 20 and an instruction decoder. A register bank 61 is also present in the core, and this bank includes control registers 10, 15, which are described in more detail later. One cache 30 is shown within the integrated circuit, although in reality there may be more than one cache.

Lines 57 and 58 represent data access requests, these can go from the core to the cache and then if a cache miss occurs to the memory 57, or they can go directly to the memory 58 if control bits within the control registers 10 and 15 indicate that the cache should not be looked at ("no" path in FIG. 2). This process is described in more detail later.

Figure 4:
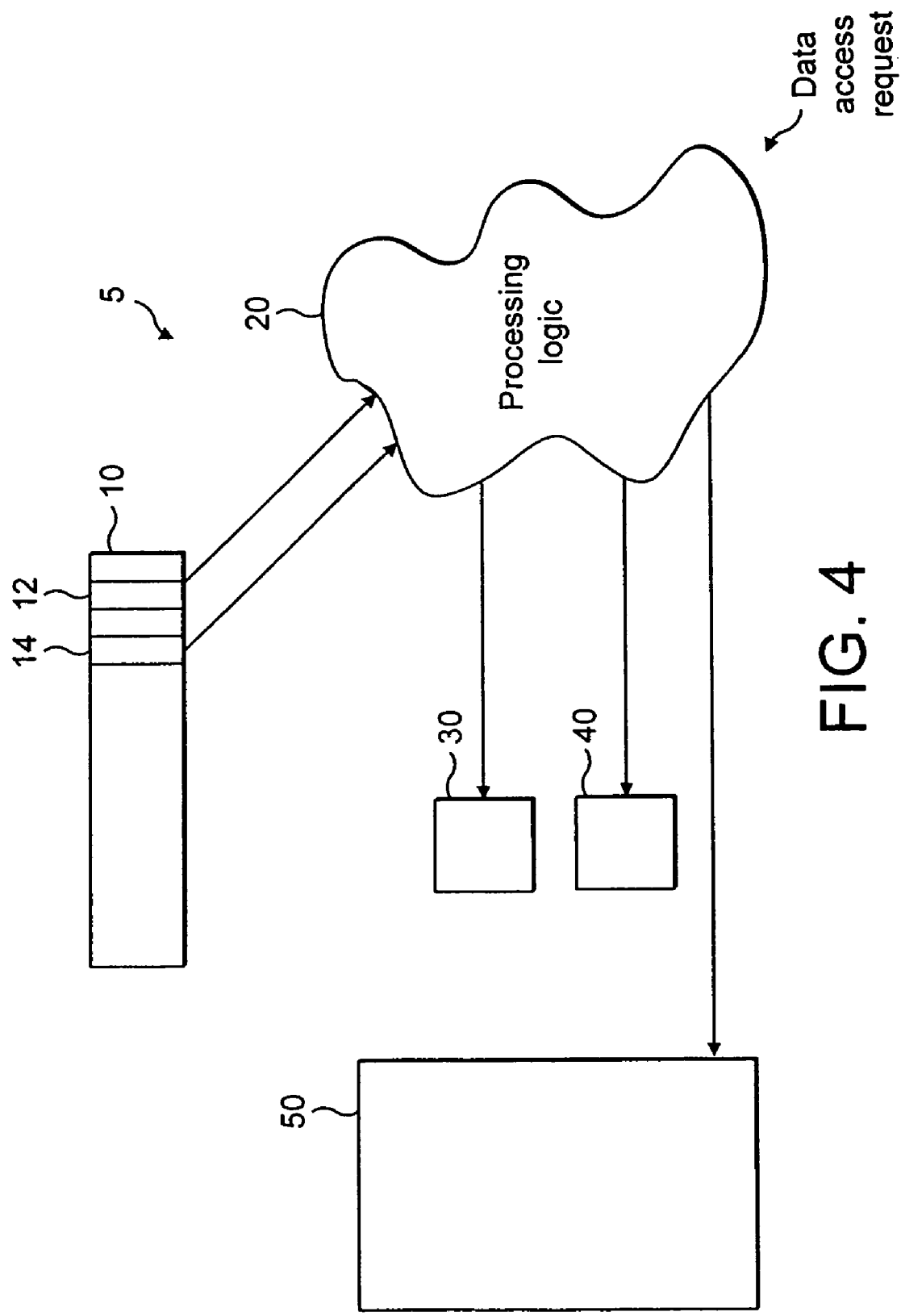
FIG. 4 schematically shows the data processor of FIG. 3 having a cache configuration according to an embodiment of the present invention.

FIG. 4 schematically shows a data processing system having a cache configuration option according to an embodiment of the present invention. FIG. 4 shows a processor 5 having a control register 10, processing logic 20, two caches 30 and 40 and memory 50. When processing logic receives a data access request, how it processes this data access request depends on the value of two control bits 12 and 14 stored in control register 10. Control bits 12 and 14 relate to caches 30 and 40 respectively and are set to indicate whether or not these caches are enabled. Thus, on receipt of a data access request the processing logic will look at control bits 12 and 14 and if either indicates its respective cache not to be enabled then the processing logic will not look in that cache in response to the data access request.

For example, if a data access request is received and control bits 12 and 14 both indicate that caches 30 and 40 are disabled then the processing logic will look for the data in memory 50 and not look first in caches 30 and 40. Thus, in this scenario, the data access request will be processed four processing steps faster than would be the case if the control bits were not present and the processing logic looked for the data in the two caches first. Furthermore, power consumption is reduced as two lookup steps are not required.

In another example control bit 12 may show cache 30 to be enabled while control bit 14 shows cache 40 to be disabled. In that case the processing logic would look in cache 30 first in response to the memory access request and then look in memory 50, ignoring cache 40 and in cases where the data is in the memory, would perform the access two processing steps faster than if it had looked in cache 40 too.

Figure 5:
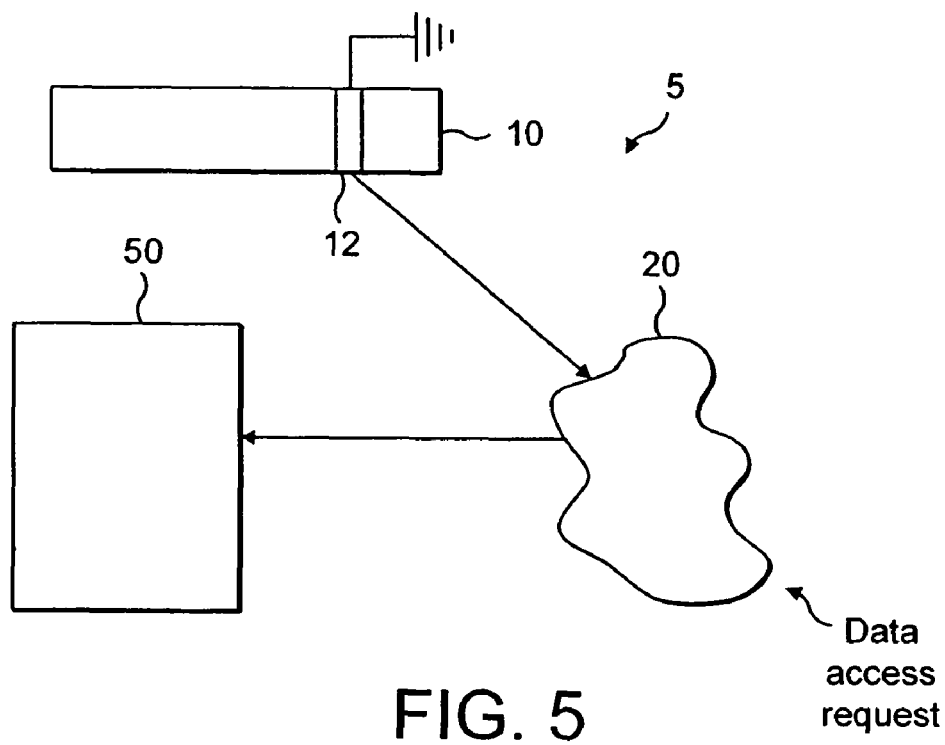
FIG. 5 shows a data processor 5 with no cache configured according to an embodiment of the present invention.

FIG. 5 shows a data processor 5 that has no cache. In this case data can not be stored in a cache and thus control bit 12 is set to a predetermined value, in this example it is hardwired to ground. This indicates to processing logic 20 that it should not look in the cache in any circumstance and thus all memory access requests are routed to memory 50.

Figure 6:
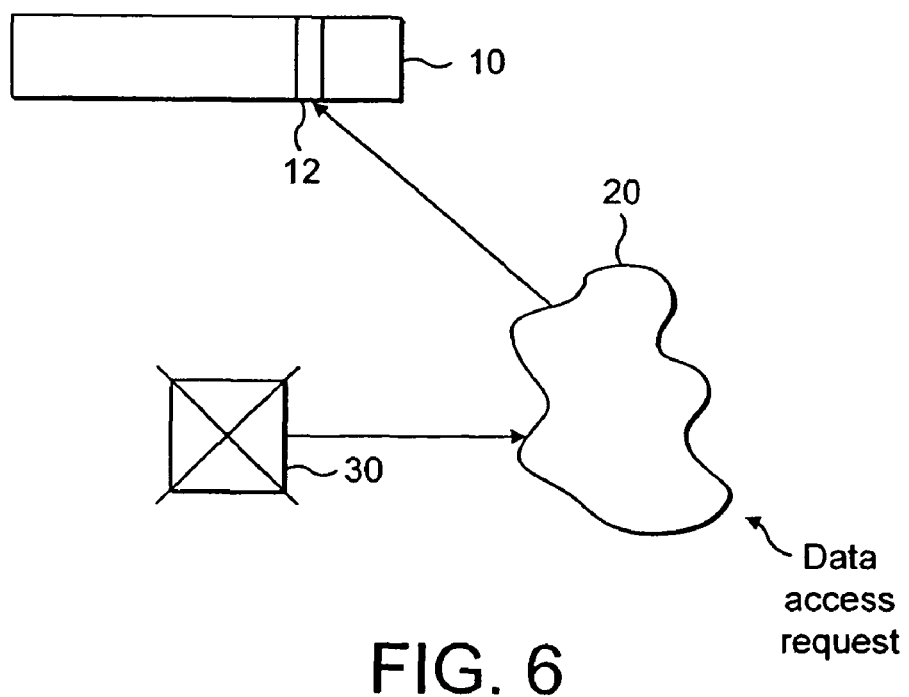
FIG. 6 schematically shows the setting of a control bit.

FIG. 6 schematically shows how control bit 12 can be set, in response to cache 30 being enabled or disabled. In such a case a signal indicating that the condition of the cache has changed (for example it was disabled and has been enabled) is detected by processing logic 20 and a signal is sent to control bit 12 to set it to the appropriate value. Thus, the value of control bit 12 mirrors the condition of the cache, and processing logic 20 can, in response to a data access request, either ignore the cache or look in it prior to looking in the memory depending on the value of control bit 12.

Figure 7:
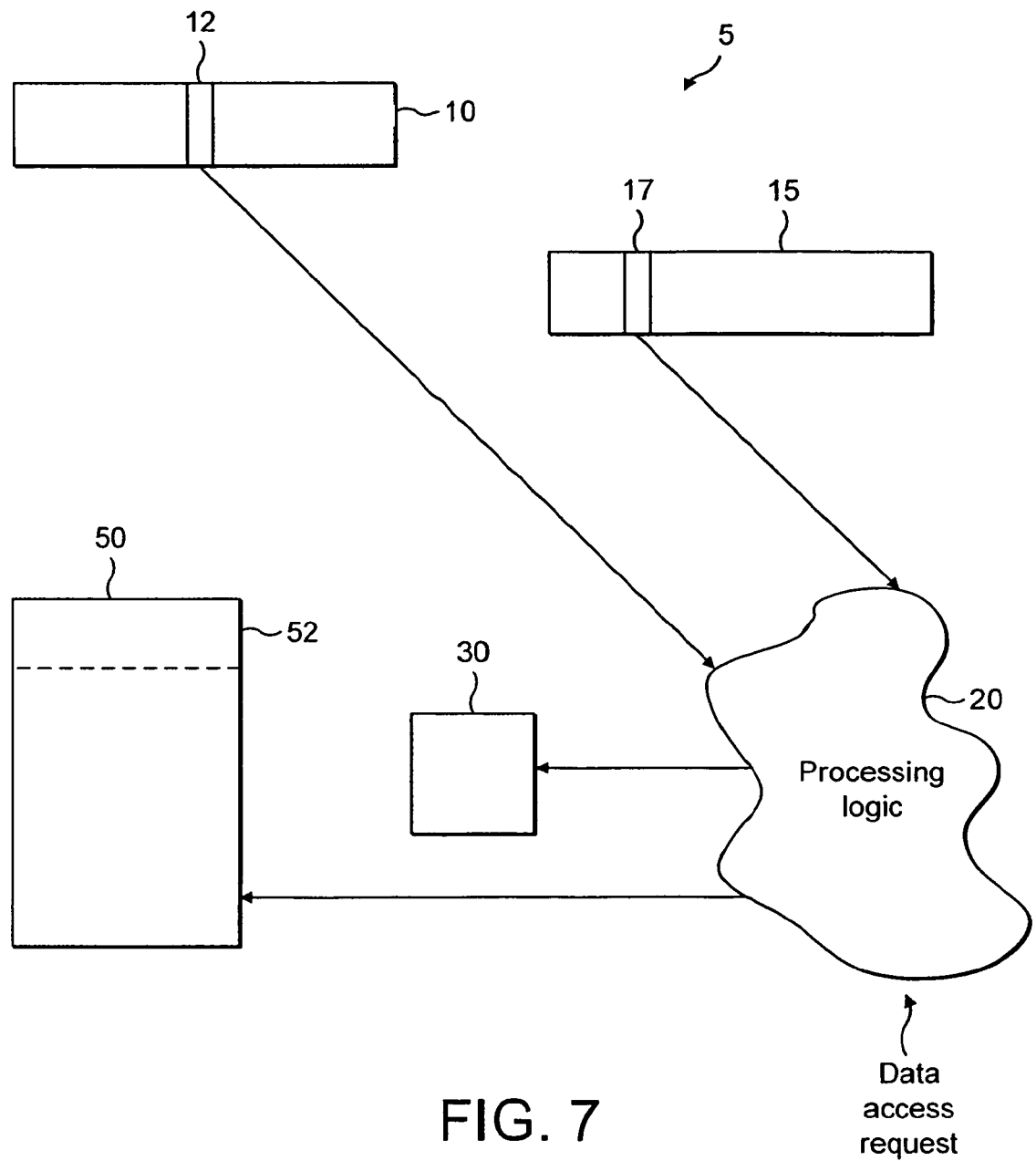
FIG. 7 schematically shows the data processor of FIG. 3, with a further control register.

FIG. 7 schematically shows a data processing apparatus 5 having two control registers 10 and 15, control register 10 having a control bit 12, and control register 15 having control bit 17. In this embodiment, control bit 12 indicates whether or not cache 30 is both present and enabled with one value or either absent or disabled with a different value as in the previous embodiment. However, in this embodiment there is an additional control register 15 with a further control bit 17. This control bit 17 is responsive to the state of the machine and can be set to indicate whether the processing logic is at present in a state where a data access could not be found in the cache. For example, if the processing logic is making data accesses to areas of the memory that are not cacheable 52 then control bit 17 can be set to a value indicating to the processing logic not to look in the cache. When the processor moves out of this state then this control bit 17 should be reset.

When the processor is in a state where data accesses are being made to a non-cacheable region of memory 52 then the processing logic can set the control bit 17 to indicate to the processor not to look in the cache. When a change in the type of memory region being accessed occurs, this indicates that the sequence of data accessing instructions accessing data within this region is over. However, if the value of control bit 17 is not changed then it will still indicate not to look in the cache and thus, this new region will be treated as a non-cacheable region. Thus, detection of a change in the type of memory region being accessed can be used as a trigger to re-evaluate control bit 17 and potentially to re-issue the access to the correct location (i.e. check the cache).

In some embodiments, not shown, there is no control bit 12 indicative of the presence or absence of an enabled cache only a control bit 17 indicative of the state of the machine. In other embodiments control bits 12 and 17 appear on a single control register.

Although particular embodiments have been described herein, it: will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. A data processor comprising:
a control register configured to store a cache control value;
data accessing logic, responsive to a data access instruction and to said cache control value, configured to look for data to be accessed in a cache if said cache control value has a predetermined value and to not to look for said data to be accessed in said cache if said cache control value does not have said predetermined value;
a further cache control value, said data accessing logic, responsive to a data access instruction and to both said cache control value and said further cache control value, configured to look for data to be accessed in a cache if said cache control value has a predetermined value and said further cache control value does not have a second predetermined value and to not to look for said data to be accessed in said cache if either said cache control value does not have said predetermined value or said further cache control value has said second predetermined value, said data processor configured to set said further cache control value to have said second predetermined value in response to a detected predetermined state of said data processor and to re-evaluate said further cache control value in response to said data processor detecting said data processor leaving said predetermined state, said predetermined state comprising execution of a sequence of data access instructions accessing a memory region that is not cacheable.

2. A data processor according to claim 1, said data processor detecting said data processor leaving said predetermined state in response to a memory access instruction being an access to a different region of memory.

3. A data processor according to claim 1, said data processor detecting said data processor leaving said predetermined state in response to a memory access instruction giving a memory region miss.

4. A data processor according to claim 3, said data processor being operable to re-issue memory access instructions giving a memory region miss following re-evaluation of said cache control value.

5. A method of data processing comprising the steps of:
   storing a cache control value within a control register;
   in response to a data access instruction and to said cache control value, reading a cache if said cache control value has a predetermined value and not reading said cache if said cache control value does not have said predetermined value, wherein said data processor comprises a further cache control value;
   reading, in response to a data access instruction and to both said cache control value and said further cache control value, a cache if said cache control value has a predetermined value and said further cache control value does not have a second predetermined value and not reading said cache if either said cache control value does not have said predetermined value or said further cache control value has said second predetermined value; and
   setting said further cache control value to have said second predetermined value in response to a detected predetermined state of said data processor and re-evaluating said further cache control value in response to detecting said data processor leaving said predetermined state, said predetermined state comprising execution by said data processor of a sequence of data access instructions accessing a memory region that is not cacheable.

6. A method according to claim 5, said method detecting said data processor leaving said predetermined state in response to a memory access instruction being an access to a different region of memory.

7. A method according to claim 5, said data processor detecting said data processor leaving said predetermined state in response to a memory access instruction giving a memory region miss.

8. A method according to claim 7, said method re-issuing memory access instructions giving a memory region miss following re-evaluation of said cache control value.

* * * * *